(12) United States Patent
Aritomi

(10) Patent No.: US 8,947,693 B2
(45) Date of Patent: Feb. 3, 2015

(54) SERVER SYSTEM, METHOD FOR PRINTING SYSTEM, AND STORAGE MEDIUM

(71) Applicant: Canon Kabushiki Kaisha, Tokyo (JP)

(72) Inventor: Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/017,540

(22) Filed: Sep. 4, 2013

(65) Prior Publication Data

US 2014/0071476 A1 Mar. 13, 2014

(30) Foreign Application Priority Data

Sep. 11, 2012 (JP) .................. 2012-199485

(51) Int. Cl.
*G06F 15/00* (2006.01)
*G06F 3/12* (2006.01)
*G06F 21/60* (2013.01)

(52) U.S. Cl.
CPC ............ *G06F 3/1203* (2013.01); *G06F 3/1222* (2013.01); *G06F 3/1239* (2013.01); *G06F 3/1288* (2013.01); *G06F 21/608* (2013.01)
USPC ....................................... 358/1.14

(58) Field of Classification Search
USPC ........................................... 358/1.14
See application file for complete search history.

(56) References Cited

U.S. PATENT DOCUMENTS 8,266,681 B2 * 9/2012 Deshpande et al. .............. 726/5

FOREIGN PATENT DOCUMENTS

JP 2010-160579 A 7/2010

* cited by examiner

*Primary Examiner* — Saeid Ebrahimi Dehkordy
(74) *Attorney, Agent, or Firm* — Canon USA, Inc., I.P. Division

(57) ABSTRACT

The server system changes a state of a printer object to a shared state to cause a second user different from a first user to be able to use the printer object upon receipt of a sharing instruction with respect to the printer registered on a print service by the first user, and deletes at least printer authentication information within the printer object in a shared state upon receipt of a deletion instruction for deleting the printer registered on the print service.

10 Claims, 15 Drawing Sheets

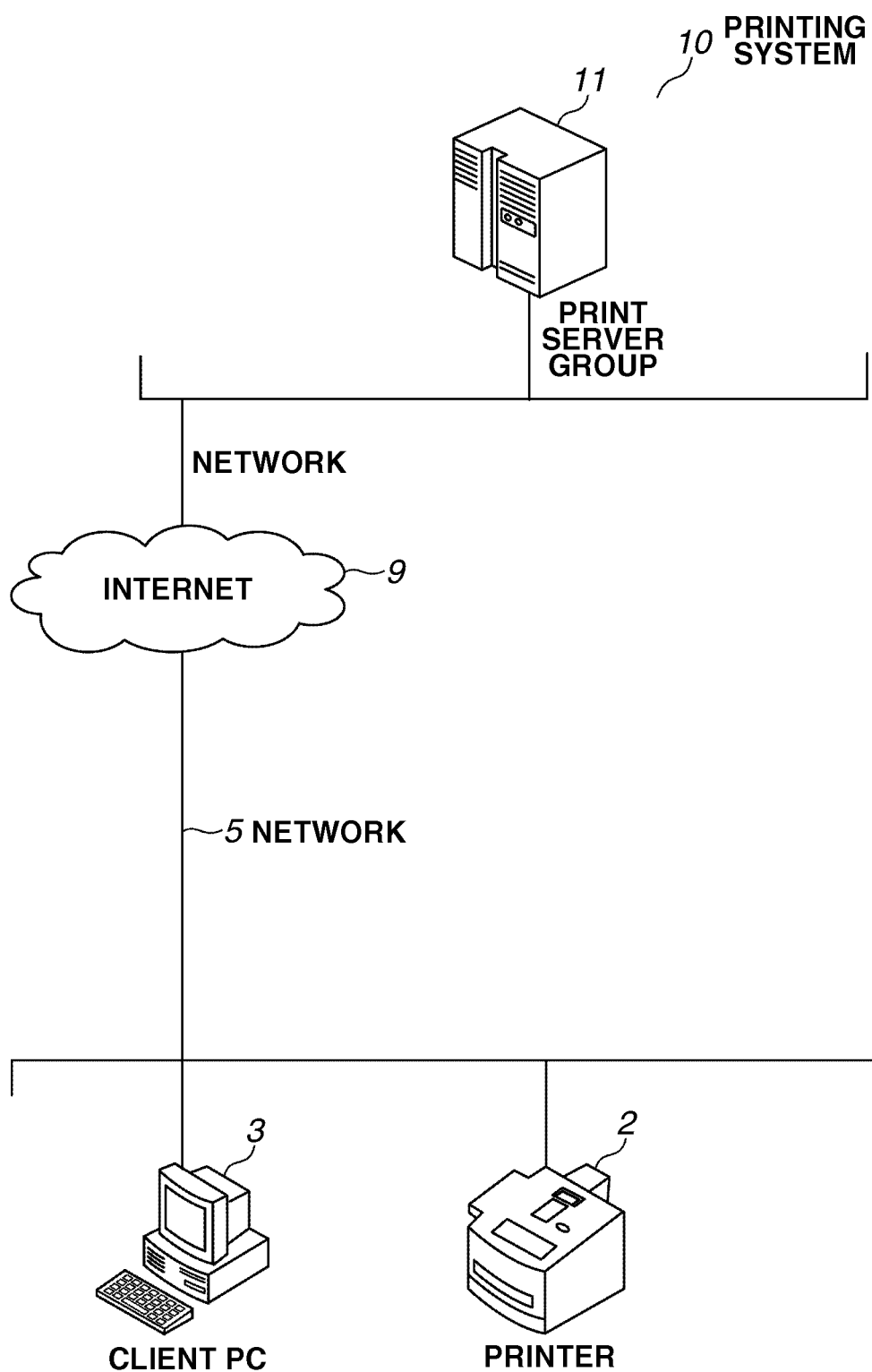

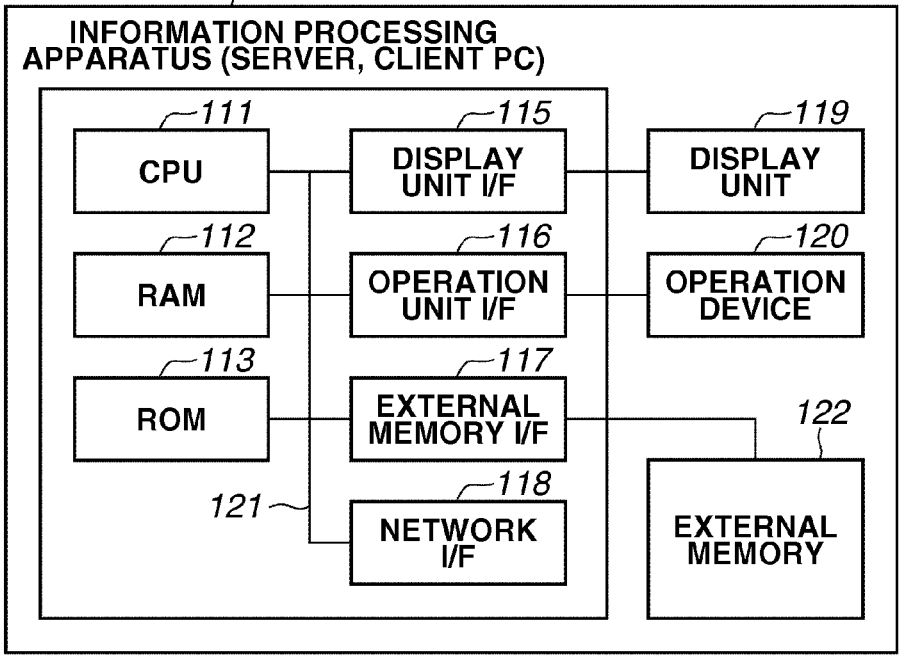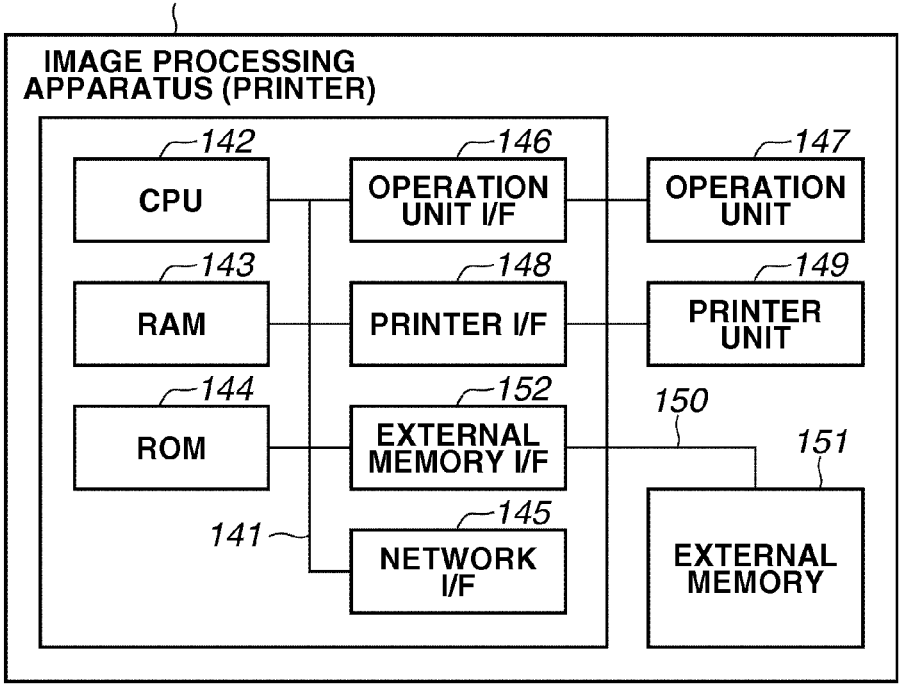

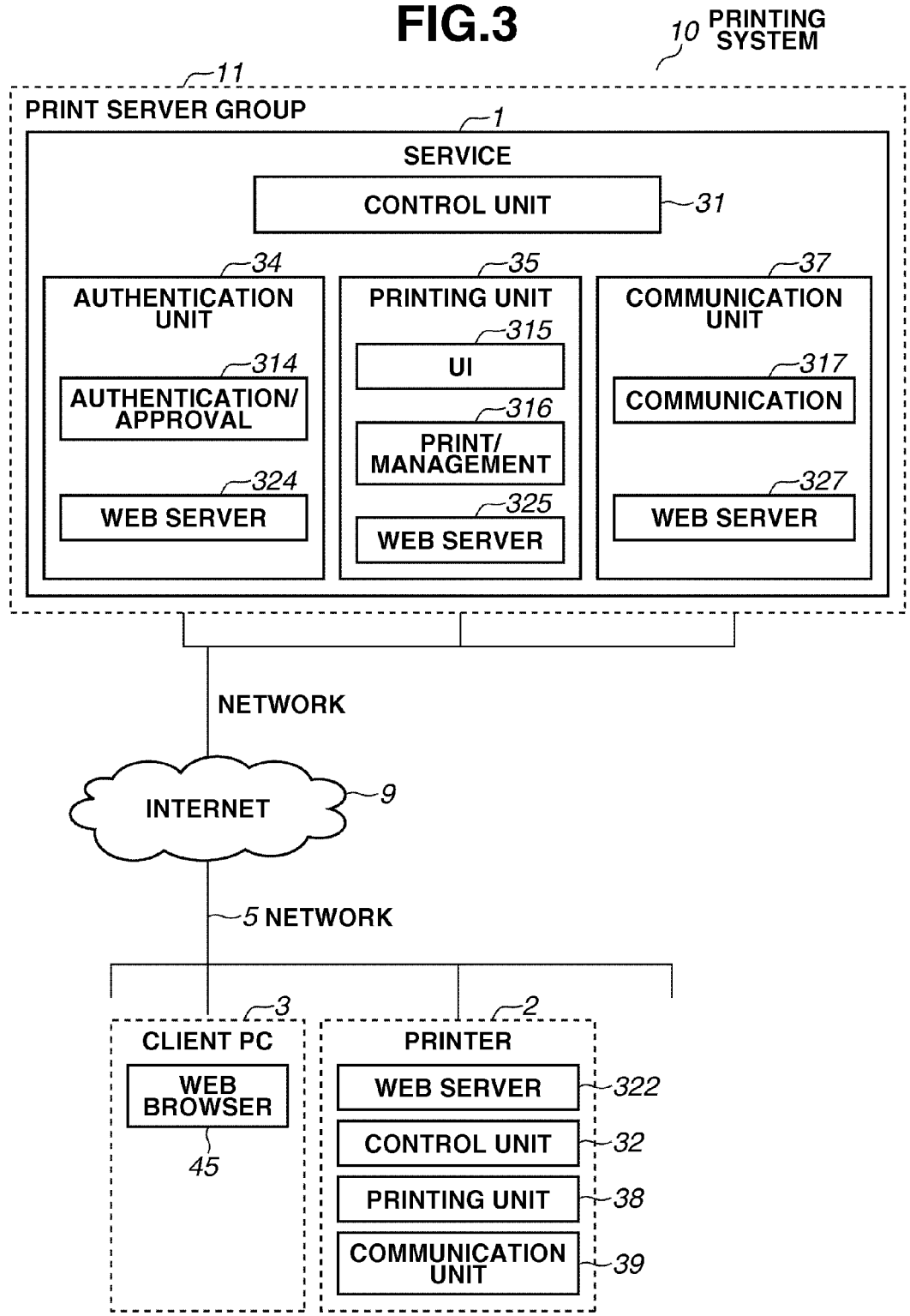

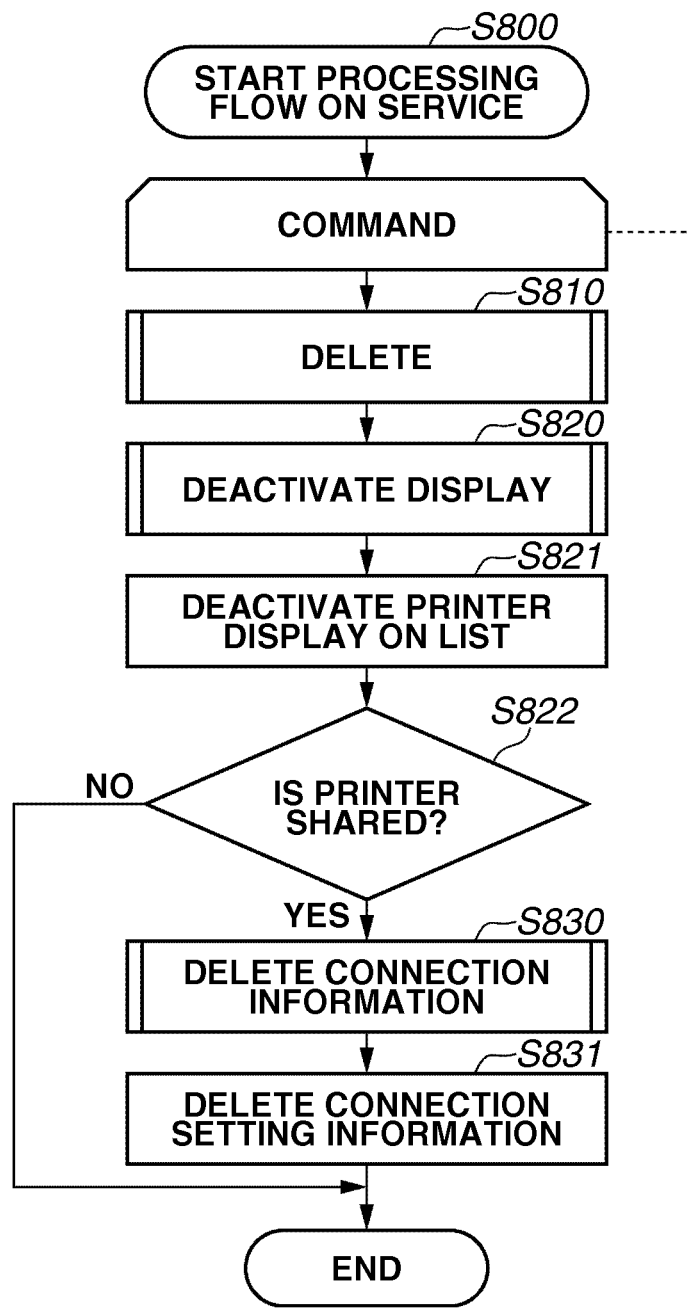

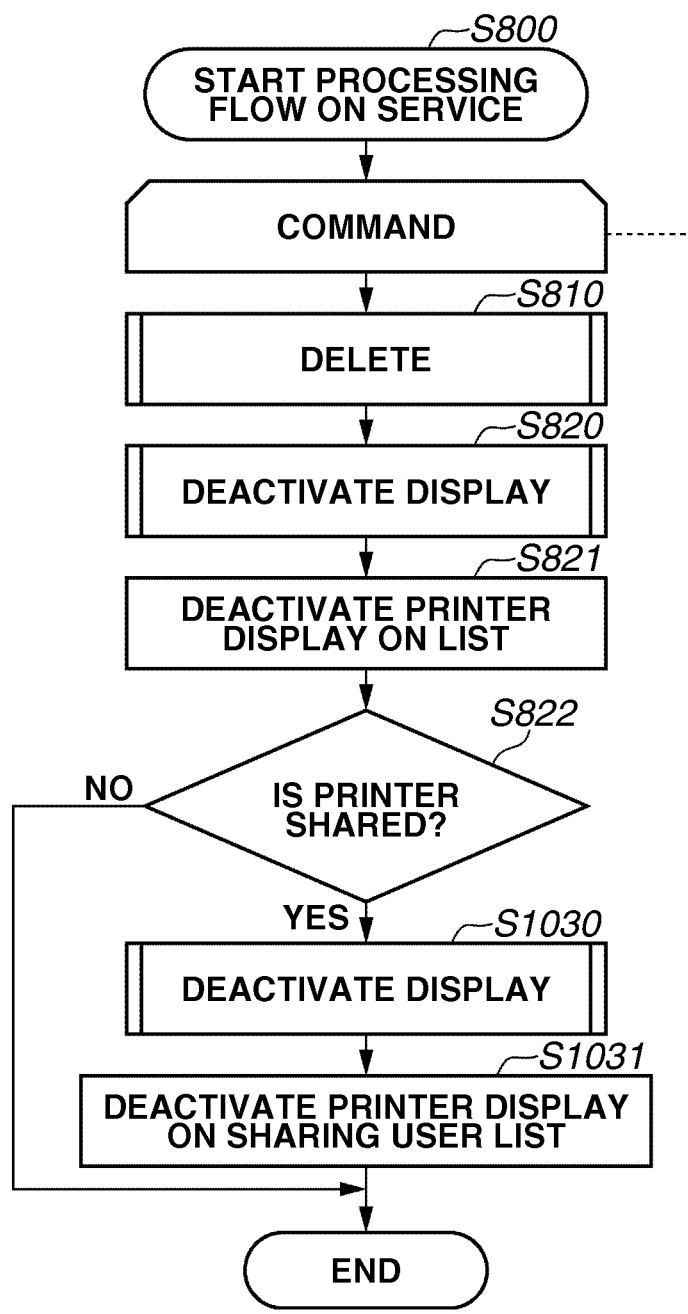

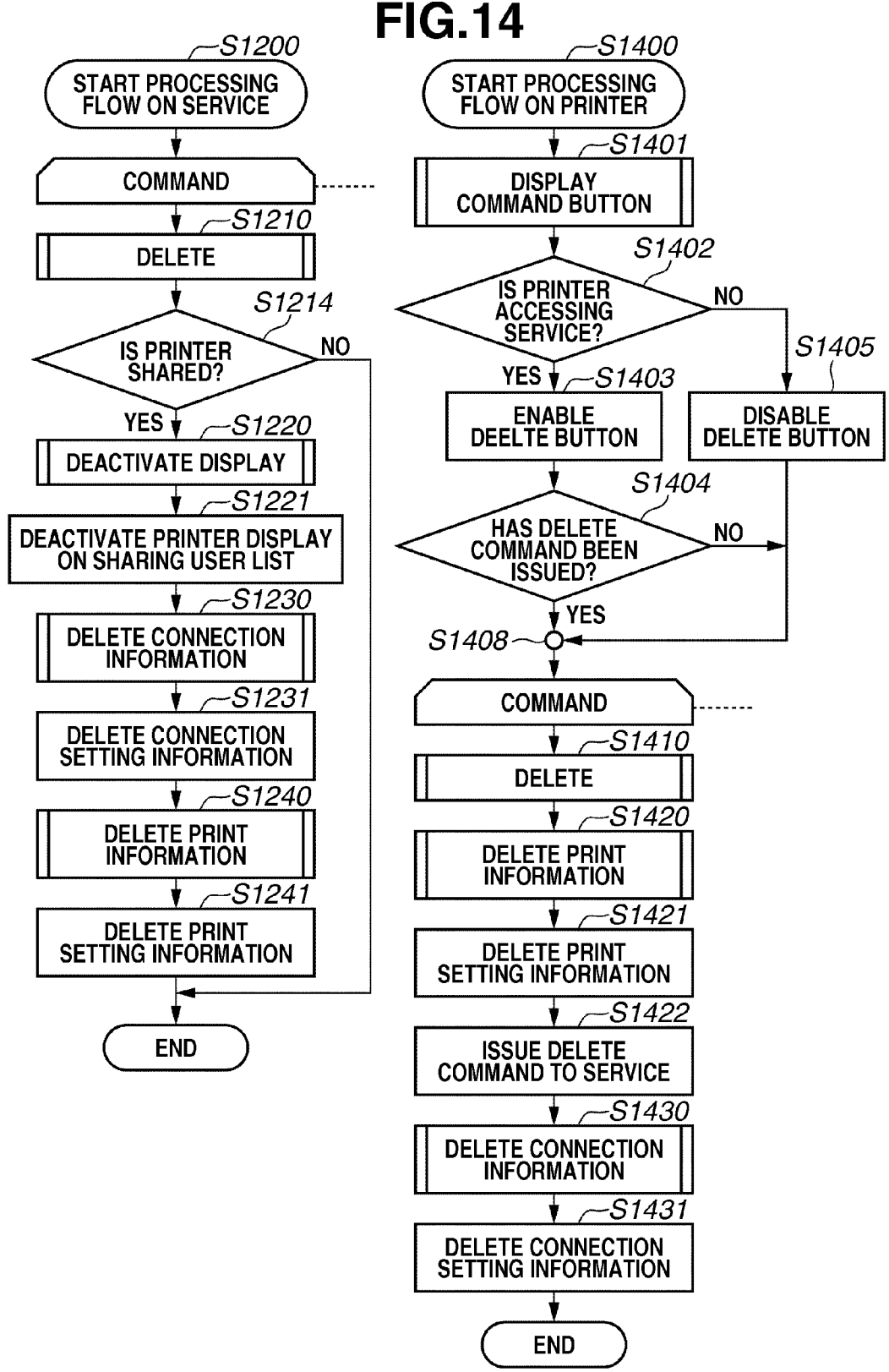

SERVER SYSTEM, METHOD FOR PRINTING SYSTEM, AND STORAGE MEDIUM

BACKGROUND OF THE INVENTION

1. Field of the Invention

The present invention relates to a server system including a print service, a method for a printing system, and a storage medium.

2. Description of the Related Art

Conventionally, a printing system using a print server has been known. The print server controls printing processing by managing a printer provided on a network, issuing a print job based on a print instruction from a user, and transmitting the print job to the printer. The user accesses to the print server via a client personal computer (PC) to instruct the print server to execute the printing processing through a printer managed thereby. As described above, the print server provides the client PC with a printing function. Such a configuration in which the server operates a part of a function on behalf of the client PC is referred to as a provision of service from the server.

In recent years, increasing attention has been given to a cloud computing. The cloud computing is also a configuration in which the server provides the client PC with services. The cloud computing is characterized in that distributed processing for data conversion or data processing is performed by employing various computing resources to concurrently process the requests from various clients. There appeared a vendor who provides various kinds of Web services through a network by implementing the services on the cloud computing environment. For example, in addition to establishing a number of large-scale data centers, Google (registered trademark) provides a Web service known as Google Cloud Print (registered trademark) which allows printers to cooperate with the cloud.

Google Cloud Print (registered trademark) introduces an interface which allows a printer and/or a device provided with a proxy to perform data communication with a cloud computing environment (hereinafter, referred to as "server" or "server system") provided by Google (registered trademark). If this interface is implemented into a printer, for example, a user can cause the printer to print data on a network specified via the client PC even if the printer is connected to the server via the internet.

In order to use the Web service to allow the device to cooperate with the server that provides the cloud service, the user needs to register the device on the server. The server generates a data group (i.e., device object) that is necessary to cooperate with the registered device, and acts as an intermediary between the user and the device via the device object when the server cooperates with the device. With respect to the device object, Japanese Patent Application Laid-Open No. 2010-160579 discusses a technique for generating a printer object used to allow the printer to cooperate with the server that provides a print service upon receipt of a registration instruction of the printer.

However, the server discussed in Japanese Patent Application Laid-Open No. 2010-160579 is different from the server of the cloud service in the management method of the device object. In the server discussed in Japanese Patent Application Laid-Open No. 2010-160579, the data within the printer object is deleted entirely upon receipt of a deletion instruction of the printer provided from the user. On the other hand, in the cloud service, in order to enrich the service thereof, instead of deleting the device object that includes the device registration information and the usage history of the service, other method tends to be used to control the cloud service not to cooperate with the device. For example, in Google Cloud Print (registered trademark), in order to cope with reconnection of the printer or to use a usage record of the printer, the printer object is not deleted. Alternatively, display of a printer selection screen is controlled to allow the registered printer to be unusable to cope with a delete instruction from the user. Since the registered printer will not be displayed on the printer selection screen, the printer object will not be used by the user even if the printer object is not deleted.

Further, the following technique is also known as a technique of the cloud service. In the cloud service, in order to efficiently operate the computing resources while reducing a load of the user, a configuration for sharing the printer object is recommended. For example, Google Cloud Print (registered trademark) also corresponds to the above configuration. First, when a manager registers a printer on the server, a printer object corresponding to the registered printer is generated. Then, in order to allow users other than the manager to use the printer object corresponding to the registered printer, the manager performs a sharing operation of the printer. Thereafter, the user allowed to share the printer becomes a sharing user, so that the shared user can use the printer object corresponding to the printer registered by a registrant. The printer corresponding to the shared printer object is referred to as a shared printer, and the sharing user can use the printer object of the registered printer by selecting the shared printer from the printer selection screen.

SUMMARY OF THE INVENTION

According to an aspect of the present invention, a server provided with a Web service for cooperating with a device includes an object generation unit configured to generate a device object used by a user in order to cause the device to cooperate with the Web service upon receipt of a registration instruction for registering the device on the Web service, a state change unit configured to change a state of the device object to a shared state in order to allow a second user different from a first user to use the device object upon receipt of a sharing instruction of a device registered by the first user, and a deletion unit configured to delete at least device authentication information within the device object in a shared state upon receipt of a deletion instruction for deleting the device registered on the Web service.

Further features of the present invention will become apparent from the following description of exemplary embodiments (with reference to the attached drawings).

BRIEF DESCRIPTION OF THE DRAWINGS

FIG. 1 is a diagram illustrating a configuration of a printing system 10.

FIGS. 2A and 2B are block diagrams illustrating hardware configurations.

FIG. 3 is a block diagram illustrating a software configuration of the printing system 10.

FIG. 8 is a flowchart corresponding to a coping method 710.

FIG. 10 is a flowchart corresponding to a coping method 730.

FIG. 14 is a flowchart corresponding to a configuration 1160.

DESCRIPTION OF THE EMBODIMENTS

Figure 4:
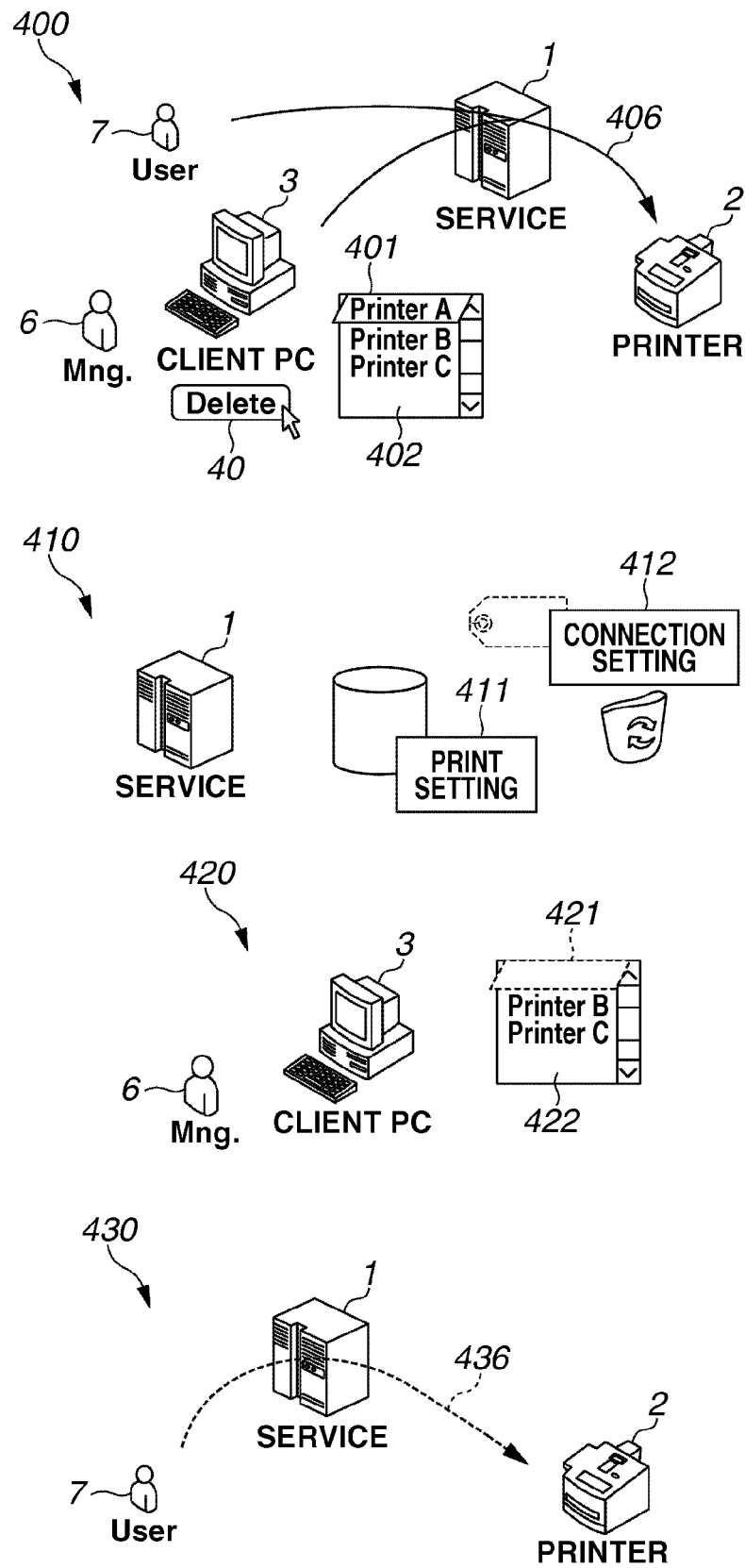
FIG. 4 is a diagram illustrating a deletion method of a printer.

Since the cloud service is applied to a client server model, a discrepancy may arise between the information within a server side and the information within a client side. For example, in a case where a sharing user browses a device selection screen at the timing before a device object has been deleted, even if the device object is deleted thereafter, the device selection screen browsed by the sharing user will not reflect the deletion of the printer on a real-time basis.

Further, because the cloud service is provided through a distributed parallel processing system in which a large number of requests is processed in parallel, each processing such as device object searching processing or device object deletion processing will be executed by the cloud service in an asynchronous manner. As a result, it may take time to reflect execution of the deletion processing on a deletion target device object linking with the entire users. Therefore, even if the client accesses the server frequently, it is not guaranteed that the printer selection screen sent from the server is the latest printer selection screen.

Due to the above-described reasons, even if the deletion instruction with respect to the device registered on the cloud service has already been issued, there may be a case where the sharing user can use the device object by selecting the device from the device selection screen. As a result that the device has been selected by the shared user, the device which is not supposed to cooperate with the cloud service may cooperate with the cloud service. As described earlier, this is because the cloud service copes with deletion of the printer by controlling the display of the device selection screen instead of deleting the device object when the cloud service receives the delete instruction. As long as the device object has not been deleted therefrom, the cloud service and the device can cooperate with each other.

An advantage of some aspects of the present invention is directed to a deletion function for deleting at least device authentication information within a shared device object to prevent a job instructed by the sharing user from being transmitted to the device when the deletion instruction of the device has been issued to the cloud service.

Hereinafter, exemplary embodiments of the present invention will be described with reference to the drawings.

A first exemplary embodiment will be described.
Configuration of Printing System FIG. 1 is a diagram illustrating a system configuration according to the present exemplary embodiment. A printing system 10 includes a print server group 11 as a server system, a printer 2, and a client PC 3 as a client computer. These devices are communicable with each other via a network 5, and the network 5 is connected to an internet 9. Further, each of the servers included in the print server group 11 is connected to each other via the network 5, and the network 5 is further connected to the internet 9. The print server group 11 is configured with a plurality of servers, therefore the print server group 11 is referred to as a server system. Thus, in the exemplary embodiment of the present invention, the term "server system" does not include the client PC 3 and the printer 2. On the other hand, the printing system 10 represents a system including not only the print server group 11 but also the client PC 3 and the printer 2.

Furthermore, in the present exemplary embodiment, although the print server group 11 as the server system is described, the print server group 11 is not necessarily configured with a plurality of servers, and a service 1 in FIG. 3, which will be described below, may be mounted on a single server. In addition, each of the devices which configures the printing system 10 can be connected to each other via the internet 9 to perform data communication. Further, more than one client PCs 3 and printers 2 may be arranged thereon. An example of the system configuration according to the present exemplary embodiment has been described. Next, an example of a hardware configuration according to the present exemplary embodiment will be described.

Hardware Configuration

FIGS. 2A and 2B are block diagrams illustrating the examples of hardware configurations of respective devices illustrated in FIG. 1. FIG. 2A is a block diagram illustrating an example of a hardware configuration of an information processing apparatus. Each server included in the print server group 11 and the client PC 3 are configured with the hardware illustrated in FIG. 2A.

A central processing unit (CPU) 111 executes a program stored in a random access memory (RAM) 112 serving as a storage unit, and collectively controls each unit connected to a system bus 121 according to a command of the program. The RAM 112 also functions as a main memory and a work area of the CPU 111. A read only memory (ROM) 113 stores various kinds of programs and data. An operation unit interface (I/F) 116 controls an input from an operation device 120 such as a keyboard or a pointing device (i.e., touch panel or mouse). A display unit I/F 115 controls display of a display unit 119. An external memory I/F 117 controls the access to an external memory 122 such as a flash memory or a solid state drive (SSD).

The external memory 122 functions as a storage medium capable of storing or reading data, and programs of an operating system (OS), Web browser and applications are stored therein. The programs stored in the external memory 122 are read onto the RAM 112 and executed by the CPU 111 as necessary. With this operation, a function of each module (software) that configures the application will be realized.

A network I/F 118 as a connection I/F for the network enables the information processing apparatus to connect to the network, and controls transmission and reception of data. The configuration thereof is not limited to the configuration illustrated in FIG. 2A, and the configuration may be such that the communication through a mobile network is controlled to make the information processing apparatus connect to the network via a wireless base station. Further, the program 135 may be stored in the RAM 112 and the ROM 113 in addition to the external memory 122.

FIG. 2B is a block diagram illustrating a hardware configuration of the printer 2. A CPU 142 controls an overall operation of the printer 2. According to the program stored in a RAM 143, the CPU 142 collectively controls each device connected to a system bus 141. In addition to functioning as a main memory and a work area of the CPU 142, the RAM 143 is also used as an input information loading area and an environmental data storage area. Further, the RAM 143 includes a non-volatile RAM (NVRAM) area, so that the memory capacity thereof can be expanded with an option RAM connected to an expansion port (not illustrated). A ROM 144 stores various fonts, a control program executed by the CPU 142, and various kinds of data.

A network I/F 145 controls data transmission and reception between the print server group 11 and the client PC 3. The network I/F 145 is provided with an element such as a Web service protocol that is suitable for the operational environment. A printer I/F 148 controls an interface for a printer unit 149 serving as a printer engine. An external memory I/F 152 controls the access to an external memory 151 such as the flash memory or the SSD. The CPU 142 executes the program stored in the external memory 151 or the ROM 144 by reading the program onto the RAM 143 as necessary, so as to realize the functions of the printer 2. An operation unit I/F 146 controls an interface for an operation unit 147 through which various kinds of setting for the printer 2 are executed.

Software Configuration of Printing System 10

FIG. 3 is a block diagram illustrating software configurations realized in respective devices which configure the printing system 10. Respective elements of the software configurations illustrated in FIG. 3 are realized when the CPUs of the respective devices illustrated in FIG. 2 executes the programs stored in the ROMs by loading the programs onto the RAMs.

The software configuration of the print server group 11 will be described. A service 1 is a cloud print service including a control unit 31, an authentication unit 34, a printing unit 35, and a communication unit 37. The printer 2 and the client PC 3 can expand the functions thereof by cooperating with the service 1. Specifically, the client PC 3 can issue a print instruction without using a driver, and the printer 2 can print data on the network by receiving a print job transmitted from the server. The control unit 31 controls the functions of the service 1 including the authentication unit 34, the printing unit 35, and the communication unit 37. Each unit operates based on the instruction of the control unit 31. The authentication unit 34 includes an authentication/approval 314. The authentication/approval 314 manages user authentication information and printer authentication information to perform authentication of the user or the printer accessing thereto based on the managed information. Although the authentication/approval 314 executes authentication of a target accessing thereto, an authentication screen will not be transmitted when the printer requests acquisition of data. This enables a load of the user for the authentication processing to be reduced when the data on the network is printed by the printer. In order to realize the above configuration, when the user registers a printer, printer authentication information has to be issued from the authentication/approval 314 and stored in the printer. At the time of printer authentication in which a data acquisition request is transmitted to the service 1, the printer also transmits the stored printer authentication information. With this operation, the printer authentication can be executed while the input of authentication information performed by the service 1 is omitted. On the other hand, for example, if the user accesses the service 1 from the client PC 3 via a Web browser 45, the service 1 requests the user to input the authentication information at each access.

The printing unit 35 includes a user interface (UI) 315 which generates a printer selection screen (not illustrated) upon receipt of a printing instruction from the user. On the printer selection screen, registered printers are displayed as a list, so that the user can select a printer from the list. The data relating to the printers stored in the service 1 cannot be seen from the user, and the user finds out the registered printers through the list. In the present exemplary embodiment, all the printers which can be seen from the user's point of view are referred to as "printers". Therefore, the information of a printer displayed by the service 1 is referred to as "printer", whereas a printer that is physically and actually provided on the user's environment is also referred to as "printer". On the contrary, a group of data that cannot be seen from the user, which is used to make the service stored in the service 1 cooperate with the printer, is referred to as "printer object". The printer object is generated upon receipt of a registration instruction of the printer from the user. The UI 315 also generates a screen through which the user issues the registration instruction. In addition, the UI 315 generates a printer management screen through which the user can issue a deletion instruction of the printer, which will be described later. The group of data which configures the printer object also includes the above-described printer authentication information. The printer object will be described below in detail.

The printing unit 35 obtains data via the network from an external device provided with other cloud service. The printing unit 35 further includes a print/management 316 that manages a print job corresponding to the data corresponding to the fact that the user selects a printer for printing the data from the printer selection screen. In addition to managing the print job, the print/management 316 also includes a function for managing the information relating to other printing, which is a part of data within the printer object. The communication unit 37 includes a communication 317 which communicates with the registered printer and transmits the print job managed by the print/management 316. The communication 317 also includes a function for storing the information necessary to communicate with the registered printer, which is a part of the data within the printer object. The service 1 uses Web servers 324, 325, and 327 in order to connect to the printer 2, the client PC 3, and the external device (not illustrated) through the Web.

A software configuration of the printer 2 will be described. A control unit 32 of the printer 2 is provided in order to control printing and/or communication processing. The control unit 32 of the printer 2 controls a communication function via the network I/F 145 of a communication unit 39, and a printing function via the printer I/F 148 of a printing unit 38. In order to allow the service 1 and the printer 2 to cooperate with each other, the communication unit 37 and the communication unit 39 communicate through a specific communication protocol to transmit and receive the print job. The printer 2 transmits the above-described printer authentication information to the service 1, and the service 1 performs authentication based on the printer authentication information. Then, the printer 2 receives the print job. The printer authentication information is also stored in the communication unit 39. When the printer 2 connects to the service 1 and the client PC 3 through the Web, the printer 2 uses a Web server 322.

A software configuration of the client PC 3 will be described. The Web browser 45 communicates with Web servers of the service 1 and the printer 2. The user can send via the Web browser 45 an instruction to the Web servers of the service 1 and the printer 2.

Schematic Diagram of Data Included in Printing System 10

Figure 6:
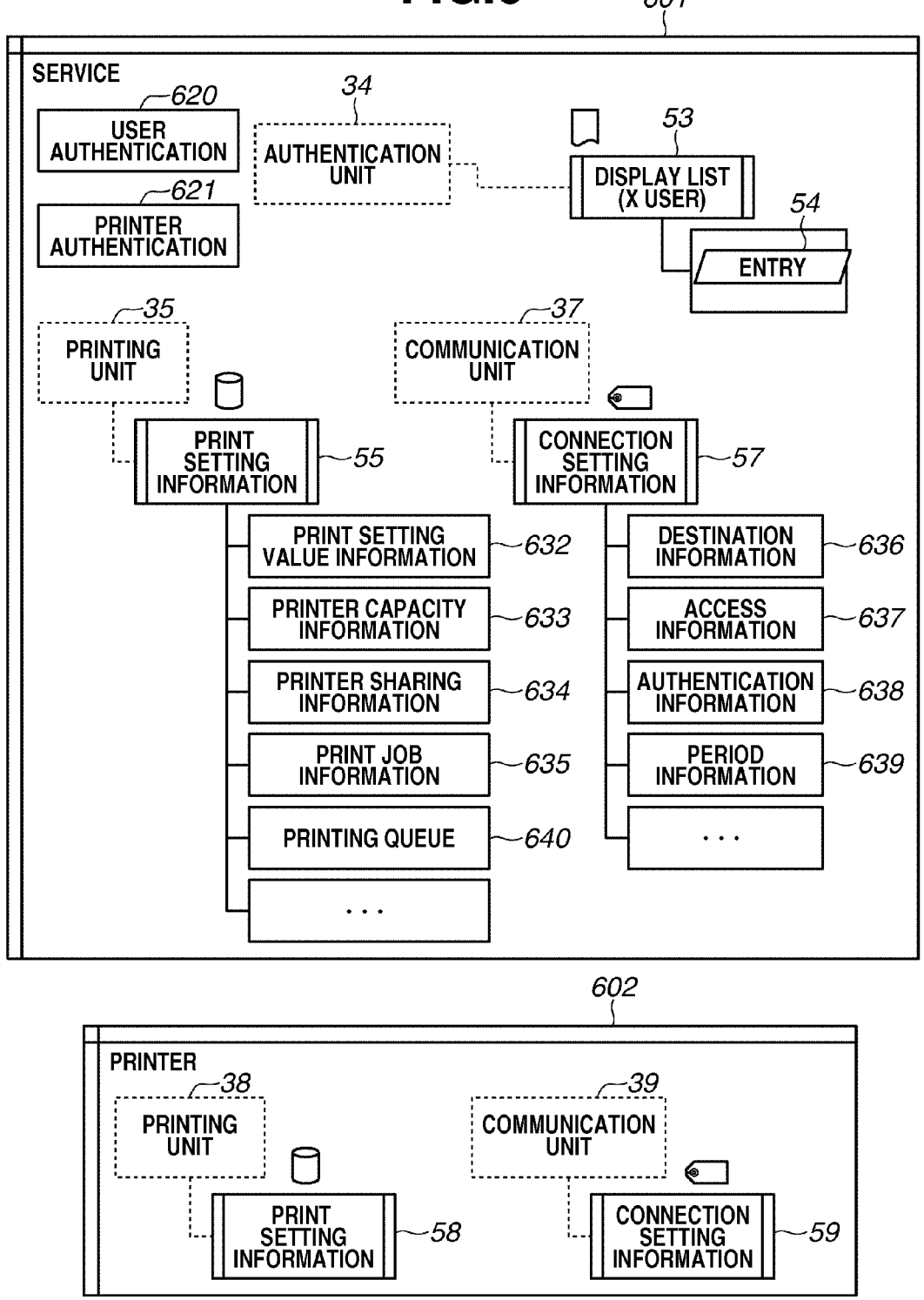
FIG. 6 is a diagram illustrating a configuration of data included in the printing system 10.

FIG. 6 is a diagram illustrating a configuration of data stored in each device which configures the printing system 10. The data stored in the print server group 11 and the printer 2 which configure the printing system 10 is illustrated therein. "Printer object" is a collective term for print setting information 55 and connection setting information 57 as a data group. In the exemplary embodiment of the present invention, as a method for deleting the information necessary to allow the service 1 and the printer 2 to cooperate with each other, there is provided a method for deleting the print setting information 55 and the connection setting information 57. The operation for this method is referred to as "deleting data within the printer object". In order to allow the service 1 and the printer 2 to cooperate with each other, the printer object is required. Furthermore, the client PC 3 and the printer 2 transmit and receive the print job via the printer object. In the present exemplary embodiment, the print setting information 58 and the connection setting information 59 are the same as the print setting information 55 and the connection setting information 57, respectively. However, the print setting information 58 and the connection setting information 59 do not have to be the same as the print setting information 55 and the connection setting information 57. For example, the printer 2 may store the connection setting information 59 that includes at least printer authentication information. Therefore, in the present exemplary embodiment, a data group stored in the printer 2 is not referred to as the printer object, but referred to as the information necessary to allow the service 1 and the printer 2 to cooperate with each other.

A user authentication 620 is authentication information of the user who uses the service 1, and the user authentication 620 is data stored in the authentication/approval 314. The user authentication 620 includes a user account and a password with respect to the service 1, and is provided in a unit of a service user.

A printer authentication 621 is authentication information of the printer registered on the service 1, which is stored in the authentication/approval 314. The printer authentication 621 is provided at each printer registered by the user.

A display list 53 is a printer selection screen generated by the UI 315, and the user who uses the service 1 selects a usable printer therefrom. The display list 53 can display an entry 54 as a registered printer, and include a list of printers linking with the user of the service 1. The entry 54 includes names or identification numbers of the printers, and the content thereof is determined based on the printer object. The user can cause the client PC 3 to display the display list 53 to select the printer through which the data on the network is printed. The entry 54 is provided so as to link with the printer object.

The print setting information 55 is the data relating to a print function of the printer, which includes the history information that indicates use of the printing function of the printer. The print setting information 55 is the data stored in the printing unit 35 and the printing unit 38. The print setting information 55 includes print set value information 632, printer capacity information 633, printer sharing information 634, and print job information 635. The print set value information 632 includes print set values such as a paper size and number of copies. The printer capacity information 633 is information relating to identification and capacity of the printer such as a printer name and a monochromatic printer/color printer. The printer sharing information 634 is information of the users who can use the printer, which indicates the users linking to the printer. The control unit 31 can confirm whether the sharing user exists based on the printer sharing information 634. The print job information 635 is the history information indicating the print job history as to what data on the network has been printed in what type of printing mode. A printing queue 640 is a printing queue of the printing jobs issued according to the print instructions from the user. The printing queue 640 includes job numbers, job names, and job states of the print jobs on the printing queue.

The connection setting information 57 is data relating to the communication between the service 1 and the printer 2, including the history information relating to the communication between the service 1 and the printer 2. Further, the connection setting information 57 is the data stored in the communication unit 37 and the communication unit 39. The connection setting information 57 includes destination information 636, access information 637, authentication information 638, and period information 639. The destination information 636 is destination information for identifying a printer location, which is the data indicating an end point of the proxy. The access information 637 is authorization information for accessing the printer 2. The authentication information 638 is information relating to printer authentication, and is the same printer authentication information as the printer authentication 621 stored in the authentication/approval 314. The data of the printer authentication 638 is used to verify the information that has been transmitted by the printer 2 together with the acquisition request of the data on the network. When the service 1 transmits the data to the printer 2, the service 1 authenticates the printer 2 based on the printer authentication information, and transmits the data to the qualified printer 2 registered on the service 1. The control unit 31 transmits the authentication information 638 as the printer authentication information and the printer authentication information received from the printer 2 to the authentication unit 34, and requests the authentication unit 34 to execute authentication processing. Based on the authentication result received from the authentication unit 34, the control unit 31 determines whether to transmit the data to the printer 2. The period information 639 is information relating to an effective period of the connection setting information 57. A certain period is described in the period information 639, and the connection setting information 57 is updated when a specific period of time has passed.

After the printer object is generated, the printer 2 corresponding to that printer object is displayed on the display list 53, so that the printer 2 is selected by the user. The user can use the printer object by selecting the printer 2. The user can allow the printer 2 to cooperate with the print service by using the printer object, so as to cause the printer 2 that corresponds to the selected printer object to print the data on the network.

Deletion Method of Printer

A method for deleting the printer according to the present exemplary embodiment will be described with reference to FIG. 4. There is provided a printer 2 managed by a manager 6. The manager 6 registers this printer 2 on a service 1, and a user 7 shares the registered printer 2. A print job from the service 1 is transmitted to the printer 2 via a connection path 406 serving as a network. On a client PC 3 used by the manager 6, an entry 401 of the printer 2 is displayed on a printer list 402 as "Printer A". The printer list 402 is a part of a display portion of a management screen 500 (described below), and is the same as the display list 53. When the manager 6 deletes the printer 2 from the service 1, the manager 6 selects the entry 401 of the shared printer 2 and presses a "Delete" button 40 (diagram 400). This "Delete" button 40 corresponds to a button for sending a deletion instruction of the printer 2 to the service 1.

A delete command is issued when the manager 6 presses the delete button 40. Then, a connection setting information 412 is deleted from the service 1 when the delete command is received by the service 1. At this time, the print setting information 411 is not deleted (diagram 410). Although the description will be given below in detail, a configuration for deleting the data from the service 1 is not limited thereto. When the manager 6 accesses the service 1 again, a display 421 of the shared printer 2 is deleted from a printer list 422 on the client PC 3 (diagram 420). Since the connection setting information 412 of the printer 2 has been deleted from the service 1, a print job from the user 7 as a sharing user with respect to the printer 2 is not transmitted to the printer 2 (diagram 430). This is because the service 1 and the printer 2 cannot cooperate with each other due to the fact that the connection setting information 412 has been deleted.

Further, "deleting the printer" according to the present exemplary embodiment indicates an operation for deleting the printer object of the printer 2 in addition to an operation for causing the visible printer 2 on the service 1 to be invisible from the user 7. On the other hand, "deleting the printer" in the conventional cloud service indicates the operation for causing the visible printer 2 on the service 1 to be invisible from the user 7. Therefore, in the present exemplary embodiment, the operations will be differentiated by respectively expressing the operation for causing the visible printer 2 on the service 1 to be invisible from the user 7 as "deactivating the printer", and the operation for deleting the printer object as "deleting the printer".

Management of Printer

Figure 5:
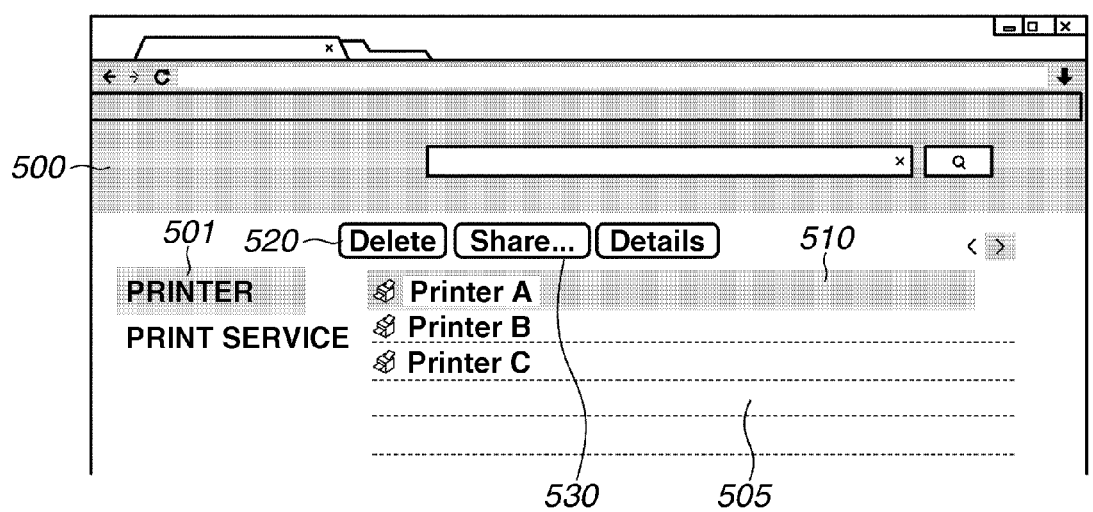
FIG. 5 is a diagram illustrating a management screen for managing a printer.

A printer management screen including the printer list illustrated in FIG. 4 will be described with reference to FIG. 5. FIG. 5 illustrates a management screen provided by the service 1 for managing the printers. If the user accesses a specific uniform resource locator (URL) of the service 1 by using the Web browser 45 on the client PC 3, the user can browse a management screen 500.

When the user selects "printer" from a menu 501 on the management screen 500 of the service 1, a printer list 505 will be displayed. A "Delete" button 520 and a "Share" button 530 are arranged on the printer list 505. An operation target printer is selected from the printer list 505. When the user presses the "Delete" button 520, the printer as a deletion target is deleted. In the present exemplary embodiment, "deleting the printer" indicates deletion of the printer object. For example, when "Printer A" is to be deleted from the setting screen 500 of the service 1, the user selects "Printer A" from the printer list 505 (highlighted area 510), and presses the "Delete" button 520. The "Delete" button 520 and the "Delete" button 40 are the same button, and thus the manager 6 can instruct via the client PC 3 the service 1 to delete the printer 2. A delete command is issued when the "Delete" button 520 is pressed.

Setting for sharing a target printer can be performed if the "Share" button 530 is pressed. For example, in order to share the printer 2 with the user 7, the manager 6 selects "Printer A" from the printer list 505 and presses the share button 530. When the manager 6 presses the "Share" button 530, a screen for inputting the user information will be displayed. Therefore, the manager 6 inputs the user information of the user 7 to perform sharing instruction. After that, a state of the printer object is changed to a shared state, so that the user 7 can use the printer 2 corresponding to "Printer A". The setting of deleting or sharing the printer can be performed only by the manager 6 who has registered the printer. Therefore, even if the user 7 displays the management screen of FIG. 5 on the Web browser, the user 7 can neither delete the shared printer nor share the printer. As a configuration for controlling the screen to cause the printer not to be selectable, for example, a configuration in which the "Share" button 530 is not displayed, or a configuration in which the "Delete" button 520 is not selectable if a shared printer is selected, may be considered. Further, the service 1 generates and transmits a management screen to the client PC 3 based on the information relating to the shared users in the printer object and the user authentication information of the user who requests the management screen.

Operation Overview of Service 1

Figure 7A:
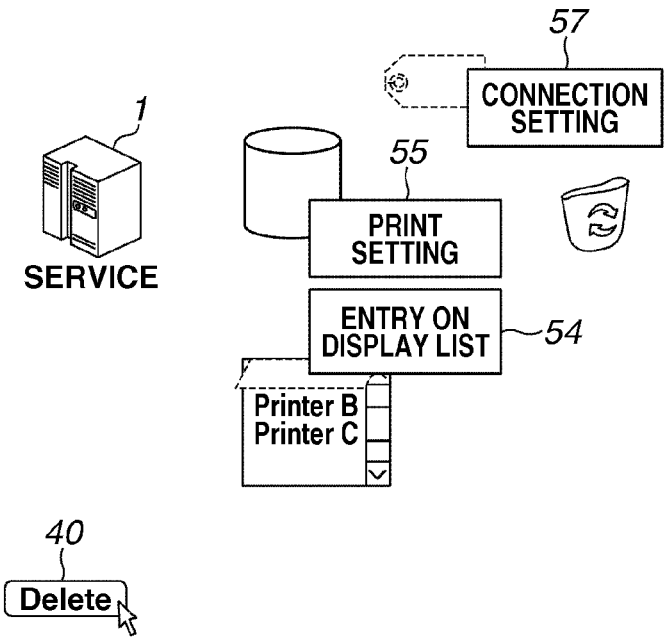
FIGS. 7A and 7B are diagrams illustrating an outline of an operation for deleting a printer performed by a service 1.

The overview of the operation performed by the service 1 after receiving the deletion instruction of the printer will be described with reference to FIGS. 7A and 7B. FIG. 7A is a diagram illustrating the operation overview of the service 1 at the time of printer deletion. When the "Delete" button 40 of the printer is pressed, the delete command is issued. The service 1 receives the delete command, and deletes the connection setting information 57 while deactivating the entry 54 of the corresponding printer on the display list 53.

As described above, in the conventional cloud service, when the device is to be deleted, the entry is simply deactivated on the display list browsed by the manager, and the information such as the connection setting information for causing the service to cooperate with the device will not be deleted. The service of the printing system 10 according to the present exemplary embodiment deactivates the entry 54 on the display list 53 while deleting the connection setting information 57 to control the print job of the sharing user not to be transmitted to the printer 2.

Figure 7B:
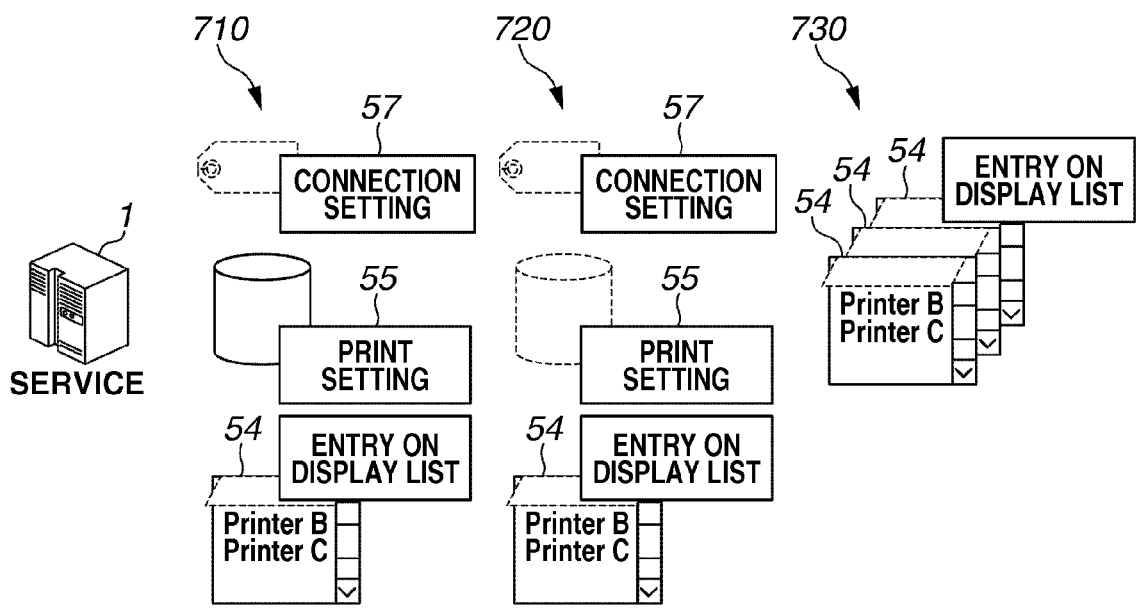

FIG. 7B is a diagram illustrating three deletion methods in the deletion operation of the printer object executed by the service 1 according to the present exemplary embodiment. When the deletion of the printer is instructed, the service 1 copes with the deletion instruction of the printer from the user through any one of the following three methods. The first method is a method illustrated in a coping method 710, which is the deletion method of the printer illustrated in FIG. 7A. The service 1 deactivates the entry 54 on the display list 53 of the manager 6 of the deletion target printer, and deletes the connection setting information 57 corresponding to that printer. The second method is a method illustrated in a coping method 720 in which the service 1 deletes the entire data relating to the printer. In addition to deactivating the entry 54 on the display list 53 of the manager 6, the service 1 deletes the connection setting information 57 and the print setting information 55. The third method is a method illustrated in a coping method 730 in which the service 1 deactivates the entries 54 of the deletion target printer on all of the display lists 53.

As described above, since the cloud service executes each processing in an asynchronous manner, it may take time to reflect the fact of the execution of the deletion processing on a deletion target device object linking with the entire users. Therefore, in the coping method 730, although deletion of data executed in the coping method 710 or 720 is not executed, at least the entry 54 is deactivated on a priority basis in order to cope with the deletion of the printer. In order to employ the coping method 730, a function for reflecting a state of the printer on the printer selection screen browsed by the sharing user on a real-time basis is desirably mounted on the service 1 and the Web browser 45. For example, a communication protocol such as WebSocket, which enables a server client-type system to perform bidirectional communication, may be employed. The service 1 concurrently deactivates the entry 54 on the display list 53 of the sharing user in addition to disabling the entry 54 on the display list 53 of the manager 6.

Flowchart Corresponding to Coping Method 710

FIG. 8 is a flowchart executed by the control unit 31 of the service 1. The service 1 deletes the connection setting information 57 when the shared printer is deleted.

In step S810, the control unit 31 starts processing according to a delete command received from the client PC 3. This processing step is started when the user who has registered the printer instructs deletion of the printer as illustrated in FIG. 4. In step S820, the control unit 31 starts deactivating the display of the entry 54 of the printer on the printer list. In step S821, the control unit 31 controls the display of the entry 54 of the printer to be deactivated on the display list 53. As described above, it may take time to reflect the deletion of the printer on the printer object linking with the entire users.

In step S822, the control unit 31 determines whether the deletion target printer is a shared printer. Specifically, the control unit 31 can determine whether the deletion target printer is a shared printer by determining whether the printer object is in a shared state based on the shared printer information 634. After executing the above-described determination processing, if the control unit 31 determines that the deletion target printer is the shared printer (YES in step S822), the processing proceeds to step S830. If the control unit 31 determines that the deletion target printer is not the shared printer (NO in step S822), the control unit 31 ends the flow of processing without deleting the connection setting information 57. As described above, even if the information thereof is not deleted, at least, the deletion target printer will not be displayed on the printer selection screen of the registered user. Furthermore, in a case where the deletion target printer is not the shared printer, a print job of the sharing user will not be transmitted to the deletion target printer even if the information thereof is not deleted.

In step S830, the control unit 31 starts deleting the connection information. In step S831, the control unit 31 deletes the connection setting information 57. Although it has been described that the service 1 entirely deletes the connection setting information 57, the configuration may be such that the service 1 deletes at least the authentication information 688 as printer authentication information. By deleting the authentication information 688, the service 1 and the printer cannot cooperate with each other unless the printer is authenticated.

The flow of processing for deleting the connection setting information 57, which is executed when the control unit 31 of the service 1 deletes the shared printer, has been described. If the service 1 employs the coping method 710, the print job from the sharing user is not transmitted because the connection setting information 57 is deleted. In addition, since the service 1 includes the print setting information 55, it is possible to enrich the service based on the printer registration information and the service usage history.

Flowchart Corresponding to Coping Method 720

Figure 9:
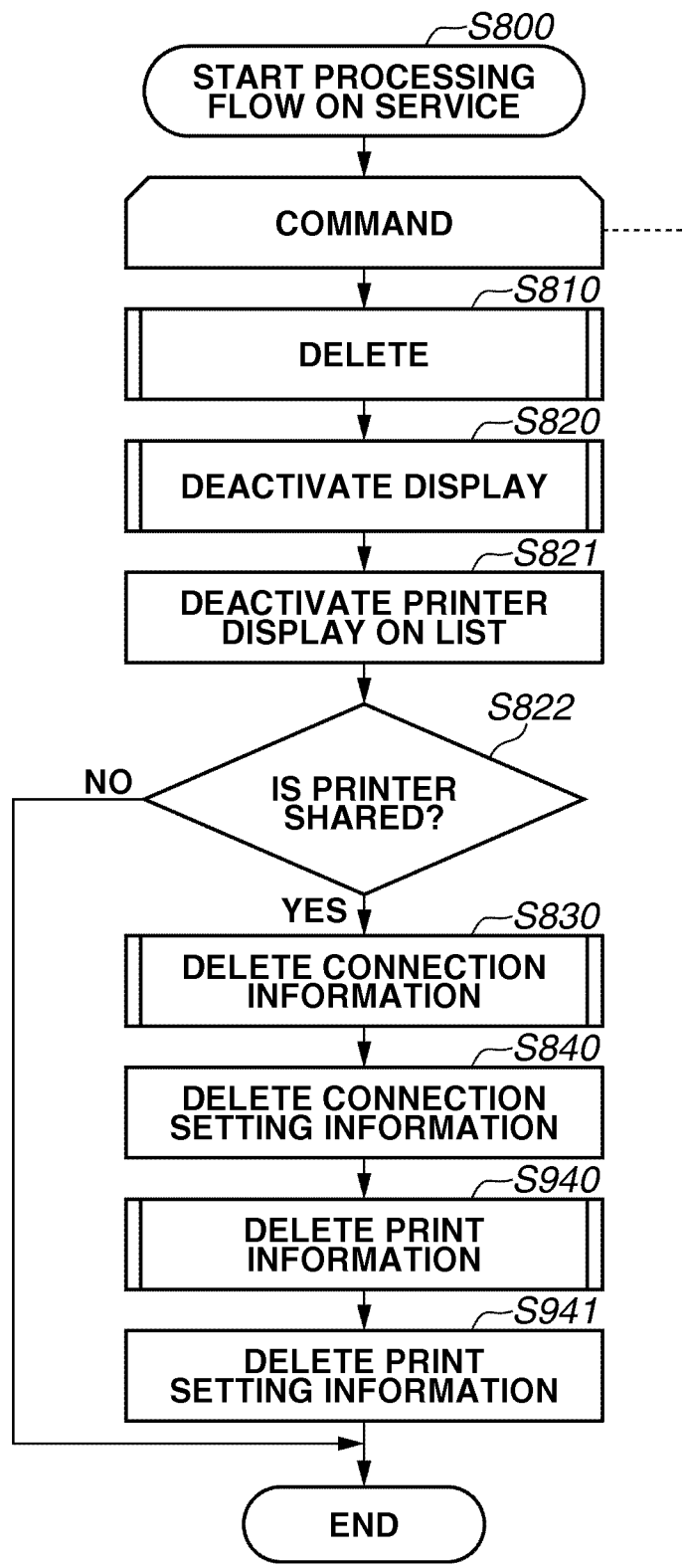
FIG. 9 is a flowchart corresponding to a coping method 720.

FIG. 9 is a flowchart executed by the control unit 31 of the service 1. The service 1 deletes the print setting information 55 and the connection setting information 57 when the shared printer is deleted. Of the processing steps in FIG. 9, processing steps having the same reference numerals as those in FIG. 8 execute the same operations as those already described in FIG. 8. Therefore, the operations that are different from the operations executed in FIG. 8 will be described below.

In step S940, the control unit 31 starts deleting the print information. In step S941, the control unit 31 deletes the print setting information 55. The execution sequence for deleting the connection setting information 57 and the print setting information 55 is not limited to the above-described execution sequence.

The flow of processing for deleting the print setting information 55 in addition to the connection setting information 57, which is executed when the control unit 31 of the service 1 deletes the shared printer, has been described. If the service 1 employs the coping method 720, a print job from the sharing user is not transmitted since the connection setting information 57 is deleted. Further, since the print setting information 55 is also deleted from the service 1, a risk in which the device information is leaked from the service 1 can be reduced. The configuration in which the entire print setting information 55 is deleted has been described above. However, the configuration thereof is not limited thereto. For example, a configuration in which only the print jobs in the printing queue 640 are deleted, and a configuration in which the print jobs and the registration information of the printers are deleted while the print job history is not deleted, are possible. Thus, configuration for deleting the information can be changed in various ways.

Flowchart Corresponding to Coping Method 730

FIG. 10 is a flowchart executed by the control unit 31 of the service 1. The service 1 deactivates the display of the entry 54 of the printer on the display list 53 of the sharing user when the shared printer is deleted. Of the processing steps in FIG. 10, processing steps having the same reference numerals as those in FIG. 8 execute the same operations as those already described in FIG. 8. Therefore, the operations that are different from the operations executed in FIG. 8 will be described below.

In step S1030, the control unit 31 starts deactivating the display of the entry 54 of the printer on the printer list. In step S1031, the control unit 31 deactivates the display of the entry 54 of the printer on the display list 53 of the sharing user. In addition, the control unit 31 may further execute the coping method 710 or the coping method 720. The flow of processing for deactivating the display of the entry 54 of the printer on the display list 53 of the sharing user, which is executed when the control unit 31 of the service 1 deletes the shared printer, has been described.

The operation for deleting the printer executed by the service 1 will be summarized below. In the coping methods 710 and 720 illustrated in FIGS. 8 and 9, in order to reduce the effect of the asynchronous processing executed by the service 1 and prevent the print job of the sharing user from being transmitted to the printer, the shared printer is deleted from the service 1 by causing the service 1 to delete the connection setting information 57. In addition, since the service 1 has not deleted the print setting information 55 in the coping method 710, it is possible to enrich the service based on the printer registration information and the service usage history.

In the coping method 730 illustrated in FIG. 10, in order to cope with the deletion instruction of the printer, the service 1 is operated in a configuration exceedingly close to the configuration of the synchronous processing, and the display of the shared printer used by the sharing user is deactivated. In addition, since the connection setting information 57 and the print setting information 55 are not deleted from the service 1, the service 1 can correspond to reconnection of the printer 2, and reuse of a usage record of the printer.

A second exemplary embodiment will be described.

Operation Example of Printing System

In the first exemplary embodiment, an operation in which the device object corresponding to a shared device is deleted from the cloud service upon receipt of a deletion instruction from the user has been described by taking a printer as an example. In the present exemplary embodiment, an operation for deleting the information stored in the device, which is necessary to cause the device to cooperate with the cloud service, will be described. This operation is executed when the device object is deleted from the cloud service. In the following description, configurations and description which are not described in particular are the same as those described in the first exemplary embodiment.

The operation will be described by taking a deletion operation of the printer in the printing system 10 as an example. In recent years, from an environment-conscious standpoint, rental printers and refurbished printers supplied from the manufacturers have been increased in number. In such a case, the printer is not physically discarded, and a manager of the printer is changed from a manager in a previous usage environment to a manager in another usage environment. With this situation, there is a possibility that the information necessary for the printer to cooperate with the cloud service, which is set by the previous manager, may be left within the printer. This can occur when the printer is configured to manage data by storing the information in a data area where the data is stored permanently, and the manufacturer does not delete the information. Leaving the information used by the previous user within the printer is not desirable in terms of information-protection and security.

In the present exemplary embodiment, based on the above-described situation, in order to ensure security of the information relating to the client, a method for causing the device to delete the information necessary to cause the service and the device to cooperate with each other will be described. An operation of the printing system 10 according to the present exemplary embodiment will be described with reference to FIGS. 11A and 11B.

Figure 11A:
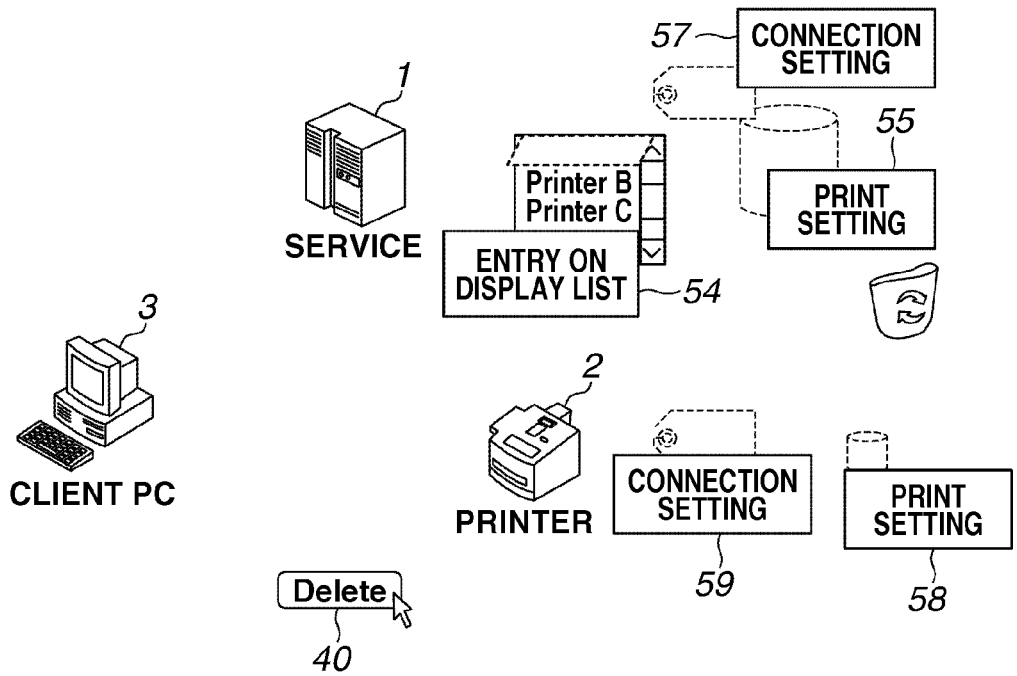
FIGS. 11A and 11B are diagrams illustrating an outline of operations for deleting a printer according to a second exemplary embodiment.

FIG. 11A is a diagram illustrating the operation overview of the service 1 and the printer 2 at the time of deleting the printer 2. When the user presses the delete button 40 provided on the printer 2 to issue a delete command, the printing system 10 deletes not only the connection setting information 57 and the print setting information 55 stored in the service 1, but also the connection setting information 59 and the print setting information 58 stored in the printer 2. Further, the printing system 10 deactivates the entry 54 on the display list 53 in the service 1 and deletes the print setting information 55 and the connection setting information 57 to cope with the deletion of the printer 2. The information to be deleted from the printer 2 illustrated in FIG. 11A does not have to be deleted entirely. Further, the deletion method of the printer 2 performed by the service 1 may be any one of the three coping methods described in the first exemplary embodiment. In addition, the service 1 may perform the same printer deletion method as in the conventional cloud print service.

Figure 11B:
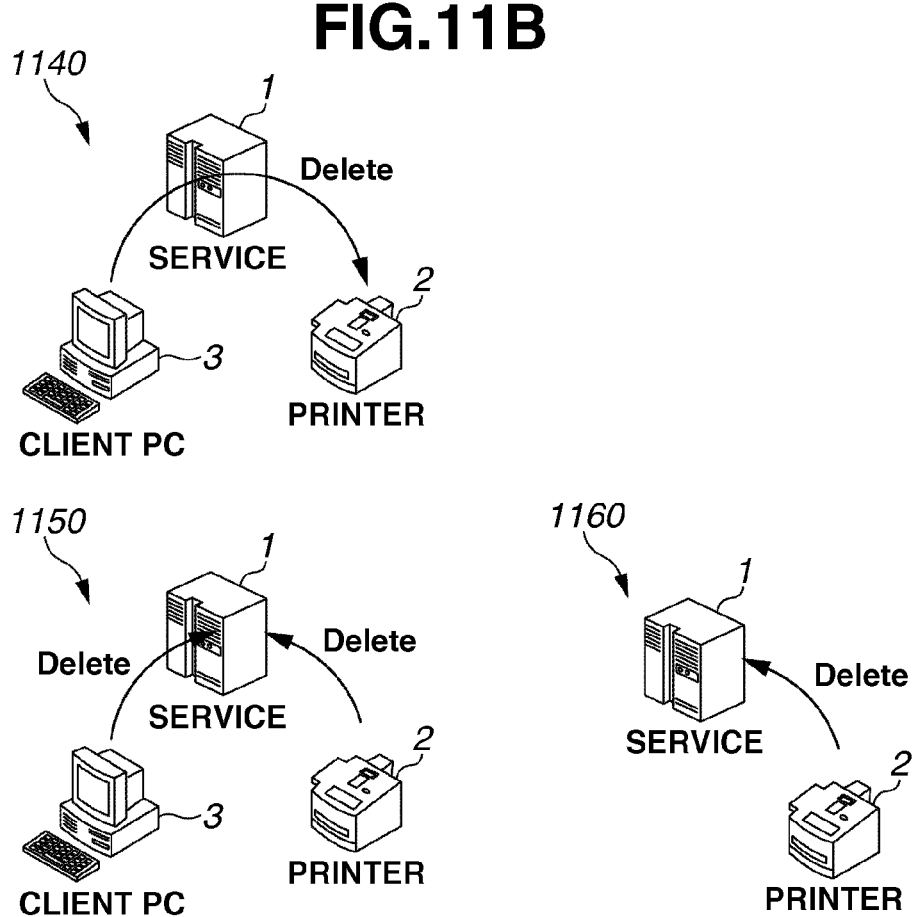

FIG. 11B is a diagram illustrating a method for deleting the information necessary to cause the service 1 and the printer 2 to cooperate with each other from the printer 2. The following three configurations may be considered as the methods for deleting the information from the printer 2.

In the first configuration, when the user issues the "Delete" via the client PC 3, the service 1 deletes the printer 2 and instructs the printer 2 to delete the information. In other words, in the first configuration, the information stored in the printer 2 is deleted by a top-down style from the service 1 to the printer 2 (configuration 1140).

In the second configuration, when the user issues the "Delete" via the client PC 3, the service 1 deletes the printer 2. Thereafter, in response to the fact that the printer 2 cannot connect with the service 1, the printer 2 itself autonomously deletes the information. In other words, in the second configuration, the service 1 and the printer 2 operate independently to delete the information by a sparse form.

In the third configuration, when the user issues the deletion instruction of the printer 2 through the delete button 40 displayed on the operation unit of the printer 2, the printer 2 deletes the stored information and transmits a command corresponding to the above-described "Delete" to the service 1 to cause the service 1 to delete the printer 2. In other words, in the third configuration, the information is deleted by a bottom-up style from the printer 2 to the service 1 as illustrated in FIG. 11A. As described above, according to the present exemplary embodiment, the information stored in the printer 2 is deleted through any one of the three deletion configurations illustrated in FIG. 11B.

Configuration in Which Service Deletes Printer and Instructs Printer to Delete Information (Top-Down Style)

Figure 12:
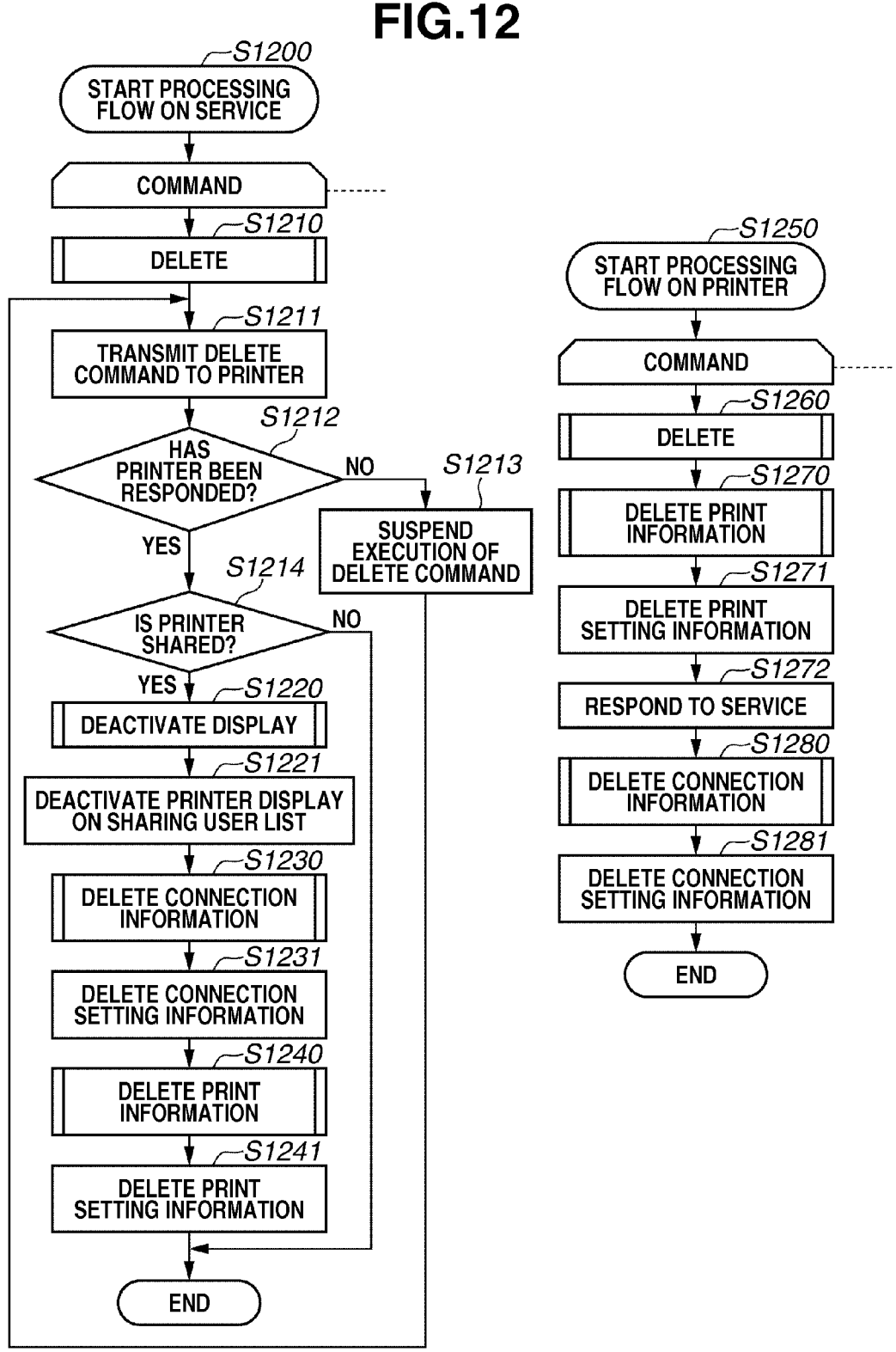
FIG. 12 is a flowchart corresponding to a configuration 1140.

FIG. 12 illustrates flowcharts of deletion processing executed by the control unit 31, and the control unit 32 of the printer 2. In the printing system 10, the service 1 transmits an instruction for deleting the information to the printer 2.

In step S1210, the control unit 31 starts processing on the delete command received from the client PC 3. The processing in step S1210 is started when the user who has registered the printer 2 instructs the deletion of printer 2 as illustrated in FIG. 4. In step S1211, the control unit 31 issues the delete command with respect to the printer 2, and transmits the delete command to the printer 2.

In step S1212, if the control unit 31 receives a response from the printer 2 (YES in step S1212), the processing proceeds to step S1214. If the control unit 31 does not receive a response from the printer 2 (NO in step S1212), the processing proceeds to step S1213. In step S1213, the control unit 31 does not execute the delete command, and suspends the execution of the delete command. In step S1214, the control unit 31 determines whether the deletion target printer 2 is a shared printer. If the deletion target printer 2 is a shared printer (YES in step S1214), the processing proceeds to step S1220. If the deletion target printer 2 is not a shared printer (NO in step S1214), the control unit 31 ends the flow of processing without deleting the print setting information 55 and the connection setting information 57.

In step S1220, the control unit 31 starts deactivating the display of the entry 54 of the printer 2 on the printer list. In step S1221, the control unit 31 deactivates the display of the entry 54 of the printer 2 on the display list 53. In step S1230, the control unit 31 starts deleting the connection information. In step S1231, the control unit 31 deletes the connection setting information 57. In step S1240, the control unit 31 starts deleting the print information. In step S1241, the control unit 31 deletes the print setting information 55. In step S1250, the control unit 32 of the printer 2 starts the processing flow. In step S1260, upon receipt of the delete command issued by the service 1, the control unit 32 of the printer 2 starts the processing.

In step S1270, the control unit 32 of the printer 2 starts deleting the print information. In step S1271, the control unit 32 of the printer 2 deletes the print setting information 58 of the printer 2. In step S1272, the control unit 32 of the printer 2 responds to the service 1 by informing the service 1 that deletion of the information has been started. Further, the timing in which the control unit 32 of the printer 2 deletes the information, and the timing in which the control unit 32 of the printer 2 responds to the service 1 by informing the service 1 that the information has been deleted are not limited to the timings described in the present exemplary embodiment. The configuration may desirably be such that the control unit 32 of the printer 2 responds to the service 1 after the information is deleted completely. However, for example, in order to coordinate the deletion timing between the service 1 and the printer 2, the configuration according to the present exemplary embodiment may be more desirable.

In step S1280, the control unit 32 of the printer 2 starts deleting the connection information. In step S1281, the control unit 32 of the printer 2 deletes the connection setting information 59 of the printer 2. Supplemental description will be given to the suspension of the delete command that is to be executed on the control unit 31. The control unit 31 suspends the execution of the delete command supposed to be executed on itself, and executes that delete command later. In the ratio of the activation time of the service 1 to the activation time of the printer 2, the activation time of the printer 2 is shorter than that of the service 1, and thus the printer 2 cannot connect with the service 1 in many cases. Accordingly, suspension processing will be required for the service 1. For example, the printer 2 cannot respond to the service 1 when the power of the printer 2 is turned off because the printer 2 is in a non-activation state. On the other hand, since the service 1 cooperates with a number of printers, the service 1 is in a non-activation state for a shorter period of time.

If the printer 2 is activated, the control unit 32 of the printer 2 receives the delete command that has been issued by the service 1 in step S1211, and starts the processing from step S1260. Further, the delete command that has been suspended by the control unit 31 due to the non-activation state of the printer 2 can be retransmitted to the printer 2 in any of the following timing of after a certain period of time, after confirming the printer connection, or after occurrence of the printer operation. The service 1 can confirm the printer connection or the printer operation by the printer 2 informing the service 1 of its own activation state when the printer 2 has been turned on and activated, or the printer 2 has been operated.

The processing flow for transmitting the deletion instruction from the service 1 to the printer 2, which is executed when the printer object is deleted from the printing system 10, has been described. If the printing system 10 employs the above-described configuration, the state of the printer object in the service 1 and the state of the printer 2 can be maintained as equivalent as possible.

Configuration in which Service Deletes Printer, and Upon Deletion of Printer from Service, Printer Autonomously Deletes Stored Information (Sparse Form)

Figure 13:
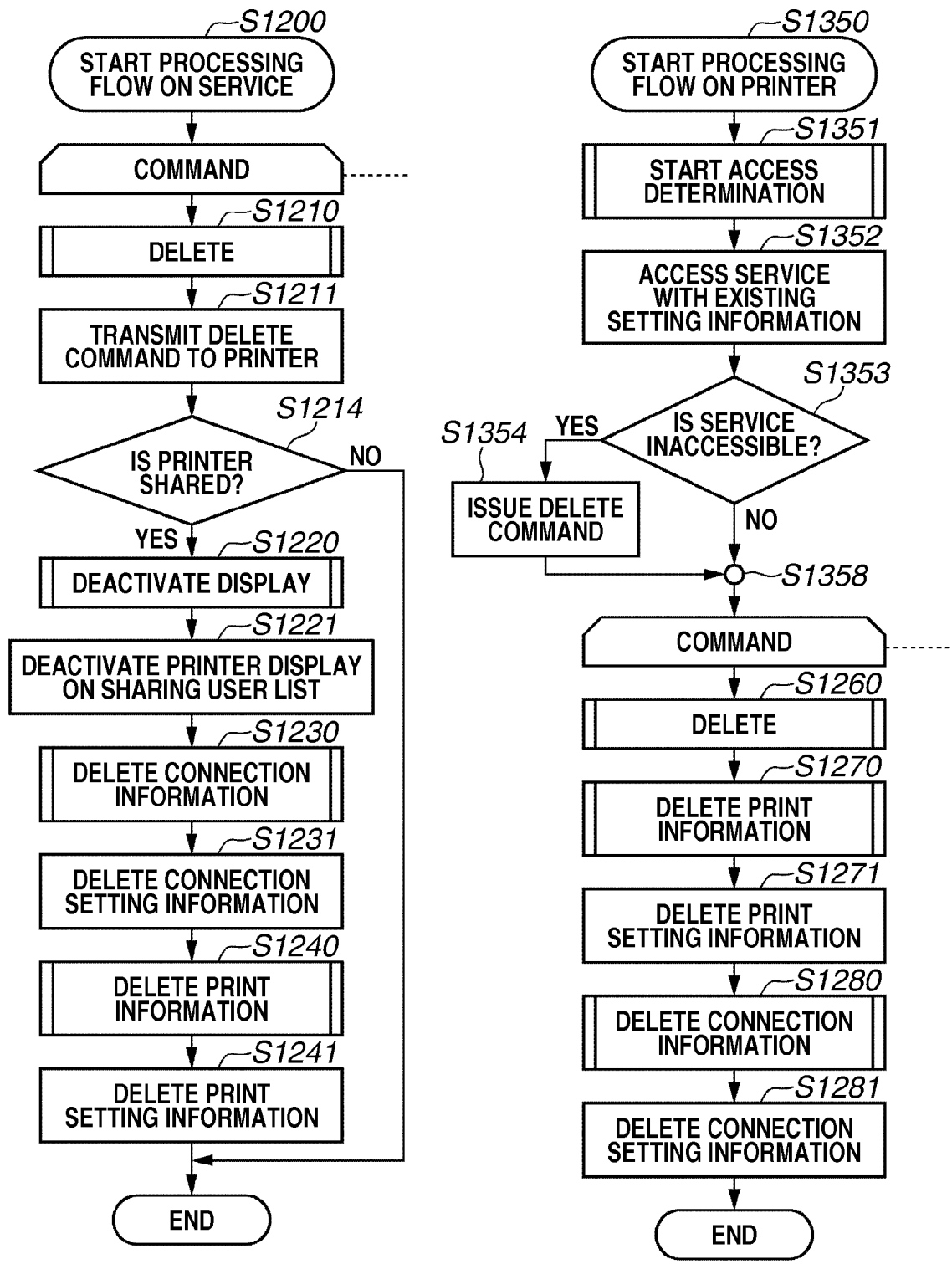
FIG. 13 is a flowchart corresponding to a configuration 1150.

FIG. 13 illustrates flowcharts executed by the control unit 31 of the service 1 and the control unit 32 of the printer 2. When the printer 2 is deleted from the printing system 10, the printer 2 autonomously performs deletion processing. Of the processing steps in FIG. 13, processing steps having the same reference numerals as those in FIG. 12 execute the same operations as those already described in FIG. 12. Therefore, the operations that are different from the operations executed in FIG. 12 will be described below.

In step S1351, the control unit 32 of the printer 2 starts the access determination. In step S1352, the control unit 32 of the printer 2 accesses the service 1 by using the connection setting information 59 as the existing setting information. In step S1353, if the control unit 32 of the printer 2 is inaccessible to the service 1 (YES in step S1353), the processing proceeds to step S1354. If the control unit 32 of the printer 2 is accessible to the service 1 (NO in step S1353), the processing proceeds to step S1358.

In step S1354, the control unit 32 of the printer 2 issues a delete command. In step S1358, the control unit 32 of the printer 2 interrupt the processing. In addition, in step S1260, the control unit 32 of the printer 2 starts the processing for the delete command if the delete command has been issued in step S1354.

In the above-described processing, the printing system 10 copes with the problem of the short activation time of the printer 2 through the determination flow of the printer 2 instead of the command from the service 1. Therefore, different from the processing illustrated in FIG. 12, the service 1 does not have to perform suspension processing of the delete command, and thus a load of the service 1 can be reduced.

Configuration in which Printer Deletes Information and Instructs Service to Delete Printer, and Service Deletes Printer (Bottom-Up Style)

FIG. 14 illustrates flowcharts executed by the control unit 31 of the service 1 and the control unit 32 of the printer 2. When the printer 2 is deleted from the service 1, the printer 2 issues a deletion instruction to the service 1. Of the processing steps in FIG. 14, processing steps having the same reference numerals as those in FIG. 12 execute the same operations as those already described in FIG. 12. Therefore, the operations that are different from the operations executed in FIG. 12 will be described below.

In step S1401, the control unit 32 of the printer 2 starts display processing of a command button. In step S1402, if the control unit 32 of the printer 2 cooperates with the service 1, or accesses to the service 1 to be capable of cooperating with the service 1 (YES in step S1402), the processing proceeds to step S1403. If the control unit 32 of the printer 2 does not access and cannot cooperate with the service 1 (NO in step S1402), the processing proceeds to step S1405.

In step S1403, the control unit 32 of the printer 2 enables a delete button (i.e., "Delete" button 40) of the operation unit 147. In step S1404, if the "Delete" button 40 is pressed and the delete command is issued (YES in step S1404), the control unit 32 of the printer 2 proceeds to processing in step S1408. Then, in step S1410, the control unit 32 of the printer 2 executes the delete command. If the delete command is not issued in step S1404 (NO in step S1404), the processing proceeds to step S1408 without the issuance of the delete command.

In step S1408, the control unit 32 of the printer 2 interrupts the processing once. In step S1422, the control unit 32 of the printer 2 issues and transmits to the service 1 a delete command for causing the service 1 to delete the printer 2.

In the above-described processing, the printing system 10 copes with the above-described problem of the short activation time of the printer 2 by causing the user to provide a printer deletion instruction via the printer 2. The user can operate and delete the actual printer 2 that is to be deleted from the service 1, so that it is advantageous in that the printer 2 can be deleted easily. The processing flow for providing the deletion instruction from the printer 2 to the service 1, which is performed when the printer 2 is deleted from the service 1, has been described.

The processing for deleting the information stored in the printer 2 performed by the printing system 10 has been described. Next, supplemental description will be given to the present exemplary embodiment. The service 1 according to the present exemplary embodiment does not delete the information necessary to cause the service 1 and the printer 2 to cooperate with each other unless the deletion target printer 2 is a shared printer. In this case, because the information is left within the service 1, an operator of the service 1 can use the information relating to the printer 2. On the other hand, the information for causing the printer 2 to cooperate with the service 1 is not left within the printer 2, so that the present exemplary embodiment is desirable in terms of information protection. Further, when the information stored in the printer 2 according to the present exemplary embodiment is deleted, the configuration thereof may be any one of a configuration in which the service 1 deletes the printer object regardless of whether the printer 2 is a shared printer, or a configuration in which the service 1 does not delete the printer object regardless of whether the printer 2 is a shared printer.

Figure 15A:
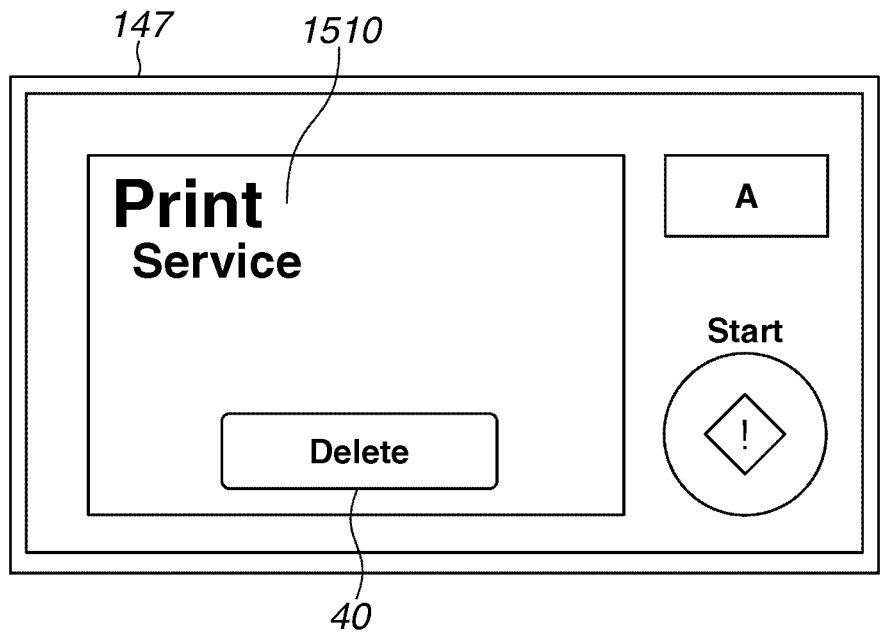
FIGS. 15A and 15B are deletion screens displayed on an operation unit of a printer.
Figure 15B:
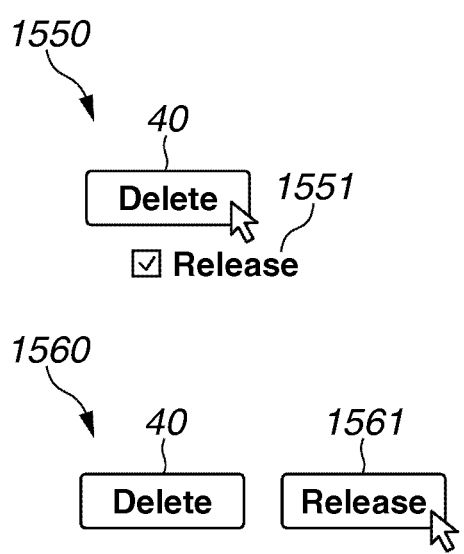

Supplemental description will be further given to the present exemplary embodiment with reference to FIGS. 15A and 15B. An example of the display of the UI of the printer 2 will be described with reference to FIG. 15A. In FIG. 15A, the operation unit 147 of the printer 2 includes a screen on which the "Delete" button 40 illustrated in FIG. 11 is displayed. The printer 2 displays a menu screen 1510 for a print service on the operation unit 147. The "Delete" button 40 is arranged on the menu screen 1510. The printing system 10 executes the processing flow illustrated in FIG. 14 when the "Delete" button 40 is pressed.

Supplemental description will be given to the "Delete" button 40 with reference to FIG. 15B. The "Delete" button 40 may be configured as follows. A "Release" checkbox 1551 is added to the "Delete" button 40 (configuration 1550). In a case where the "Delete" button 40 is pressed when the "Release" checkbox 1551 is OFF, regardless of whether the printer object is in a shared state, the service 1 controls the display without deleting the printer object whereas the printer 2 executes the deletion operation of the printer 2 illustrated in FIG. 14.

On the other hand, in a case where the "Delete" button 40 is pressed when the "Release" checkbox 1551 is ON, the printing system 10 executes the processing flow illustrated in FIG. 14. The following effect can be obtained from the above configuration. For example, if the printer 2 will no longer be connected to the service 1 again, the user places a check mark on the "Release" checkbox 1551 to delete the printer object from the service 1, and presses the "Delete" button 40 to delete the information stored in the printer 2. As a result, the printer 2 is completely released from the printing system 10, and the information relating to the printer 2 does not exist on the printing system 10. Therefore, the configuration thereof is desirable in terms of security.

On the other hand, if the check mark is not placed on the "Release" checkbox 1551, the information stored in the printer 2 is simply deleted. Therefore, the configuration is advantageous not only in that the amount of information transmitted from the printer 2 at the reconnection time can be reduced, but also in that the service side operating the service 1 can efficiently use the information. In addition, an expression "enable" represents a state where the button is pressed and the checkbox is checked, whereas an expression "disable" represents a state where the button is not pressed and the checkbox is not checked.

The above-described configuration can correspond to both the conventional deletion processing and the deletion method according to the present exemplary embodiment, and thus the configuration can flexibly provide benefits to both the service side operating the service 1 and the user side managing the printer 2.

Other Exemplary Embodiment

The configuration unique to the exemplary embodiments of the present invention has been described by taking a printer as an example of the device. However, in addition to the printer, the present invention is applicable to any system in which a cloud service cooperates with the devices. For example, a scanner, a facsimile apparatus, a moving image reproduction apparatus can be given as the examples of the devices. In the present invention, a configuration in which device authentication information within a device object corresponding to the above-described device is deleted, and/or a configuration in which the information stored in the device is deleted, may as well be possible.

The present invention can be realized by executing the following processing. That is, software (a program) for realizing the functions of the above-described exemplary embodiments is supplied to a system or an apparatus via a network or various kinds of storage media, and thus a computer, a CPU, or a micro processing unit (MPU) of the system or the apparatus reads out and executes the program.

The exemplary embodiments according to the present invention have been described in detail as the above. However, the present invention is not limited to the above-described specific exemplary embodiments, and many variations and modifications are possible without departing from the essential spirit of the invention as described in the appended claims.

Advantageous Effect of Invention

According to the aspect of the present invention, in a case where an instruction for deleting a device is issued to a cloud service, the cloud service can delete at least device authentication information within a device object in order to prevent a job instructed from a sharing user from being transmitted to the device.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-199485 filed Sep. 11, 2012, which is hereby incorporated by reference herein in its entirety.

What is claimed is:

1. A server system including a print service for causing a printer to print data on a network, the server system comprising:
   an object generation unit configured to, upon receipt of a registration instruction for registering the printer on the print service, generate a printer object used to cause the printer to cooperate with the print service;
   a state change unit configured to, upon receipt of a sharing instruction with respect to the printer registered by a first user, change a state of the printer object to a shared state in order to cause a second user different from the first user to be able to use the printer object; and
   a deletion unit configured to, upon receipt of a deletion instruction for deleting a printer registered on the print service, delete at least printer authentication information within the printer object in a shared state.

2. The server system according to claim 1, further comprising a determination unit configured to determine whether a state of a printer object as a deletion target is a shared state;
wherein, upon receipt of a deletion instruction for deleting a printer registered on the print service, the deletion unit is configured, in a case where the determination unit determines that the printer object as a deletion target is not in a shared state, not to delete the printer object, and in a case where the determination unit determines that the printer object as a deletion target is in a shared state, to delete at least printer authentication information within the printer object.

3. The server system according to claim 1, further comprising a transmission unit configured to, upon receipt of a deletion instruction for deleting the printer registered on the print service, transmit to the printer a command for deleting information necessary to cooperate with the print service.

4. The server system according to claim 3,
wherein the deletion unit waits for a response from the printer without deleting the relevant printer object until the printer that has received the transmitted command sends the response, and deletes at least printer authentication information within the printer object in a shared state after receiving a response from the printer that has received the transmitted command.

5. The server system according to claim 1,
wherein the printer object includes print setting information relating to a printing function of the printer and connection setting information relating to communication with the printer;
wherein the deletion unit deletes the connection setting information including the print setting information and the printer authentication information.

6. The server system according to claim 1,
wherein the printer object, at the time of authentication of the printer that transmits the data acquisition request upon receipt of a print job from the print service, includes in addition to printer authentication information used to verify information transmitted by the printer together with an acquisition request, print setting value information as print setting information relating to printing function of the printer, printer capacity information, printer sharing information, and print queue for managing a print job that is issued based on a print instruction from the user;
wherein the server system further comprises:
a screen generation unit configured to generate a printer selection screen in which registered printers are displayed as a list, and a printer for printing the data can be selected therefrom; and
a determination unit configured to determine whether a state of the printer object as a deletion target is a shared state,
wherein the screen generation unit generates the printer selection screen based on the print setting value information and the printer capacity information, and
wherein the determination unit determines whether a state of the printer object as a deletion target is a shared state based on the printer sharing information.

7. The server system according to claim 6,
wherein the screen generation unit configured to, upon receipt of an acquisition request of a printer selection screen, generate a printer selection screen that includes a printer registered on the print service;
wherein the screen generation unit configured to, in a case where the screen generation unit receives an acquisition request of a printer selection screen at a timing after receiving a deletion instruction for deleting a printer registered on the print service, generate a printer selection screen from which the relevant printer cannot be selected.

8. The server system according to claim 1, further comprising a management screen generation unit configured to generate a printer management screen,
wherein the management screen generation unit, in a case where a printer management screen is requested from the first user who has registered the printer, generates the printer management screen through which a deletion instruction for instructing deletion of a printer registered on the print service can be issued,
wherein the management screen generation unit, in a case where a printer management screen is requested from the second user as a sharing user, generates the printer management screen through which the deletion instruction for instructing deletion of the printer registered on the print service cannot be issued, and
wherein the deletion unit receives a deletion instruction from the first user through the printer management screen and deletes at least printer authentication information within a shared printer object.

9. A method for a printing system including a server system having a print service for causing a printer to print data on a network, a client computer, and a printer, the method comprising:
transmitting information relating to the printer to the print service;
generating a printer object used to cause the printer to cooperate with the print service upon receipt of a registration instruction for registering the printer on the print service and upon receipt of the information relating to the printer;
transmitting a sharing instruction to the print service through the client computer upon receipt of the sharing instruction from a first user;
changing a state of the printer object to a shared state in order to cause a second user different from the first user to be able to use the printer object upon receipt of the shared instruction with respect to the printer registered by the first user;
transmitting a deletion instruction to the print service through the client computer upon receipt of the deletion instruction from a user; and
deleting at least printer authentication information within the printer object in a shared state upon receipt of a deletion instruction for deleting a printer registered on the print service.

10. A non-transitory computer readable storage medium storing a program executed by a server including a print service for causing a printer to print data on a network, the program comprising:
generating a printer object used to cause a printer to cooperate with the print service upon receipt of a registration instruction for registering the printer on the print service;
changing a state of the printer object to a shared state in order to cause a second user different from a first user to be able to use the printer object upon receipt of a shared instruction with respect to the printer registered by the first user; and
deleting at least printer authentication information within the printer object in a shared state upon receipt of a deletion instruction for deleting a printer registered on the print service.

* * * * *